Figure 1:
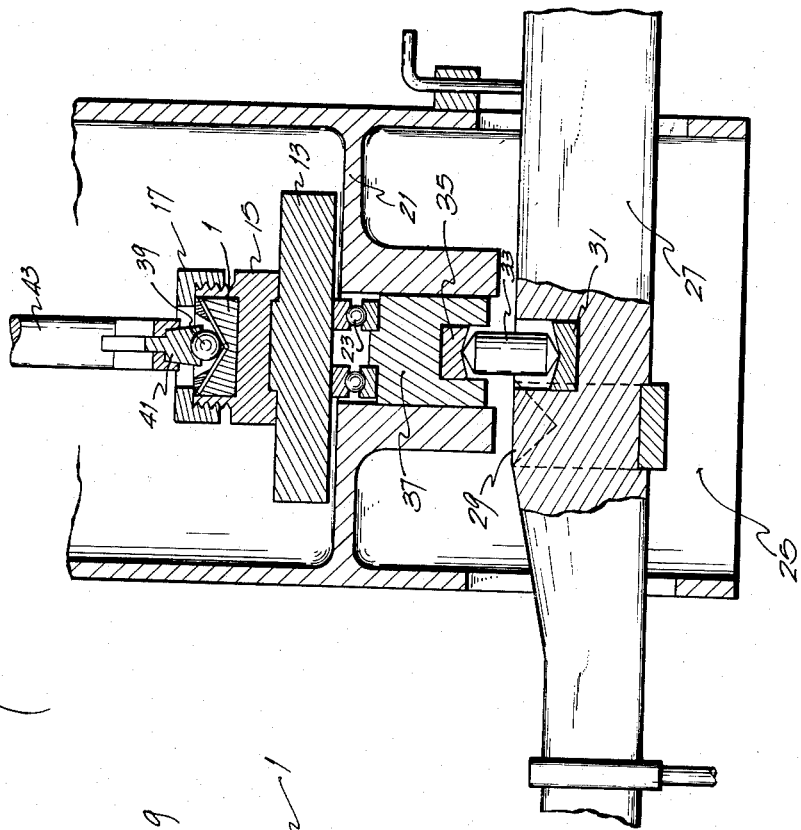

Dec. 10, 1963

B. E. MORGAN 3,113,449

FLAT SPECIMEN WEAR TESTER

Filed Feb. 27, 1961

2 Sheets-Sheet 1

INVENTOR.
Benjamin E. Morgan
BY Arthur L. Collins
John P. Crenan
Attorneys

Dec. 10, 1963  B. E. MORGAN  3,113,449
FLAT SPECIMEN WEAR TESTER
Filed Feb. 27, 1961  2 Sheets-Sheet 2
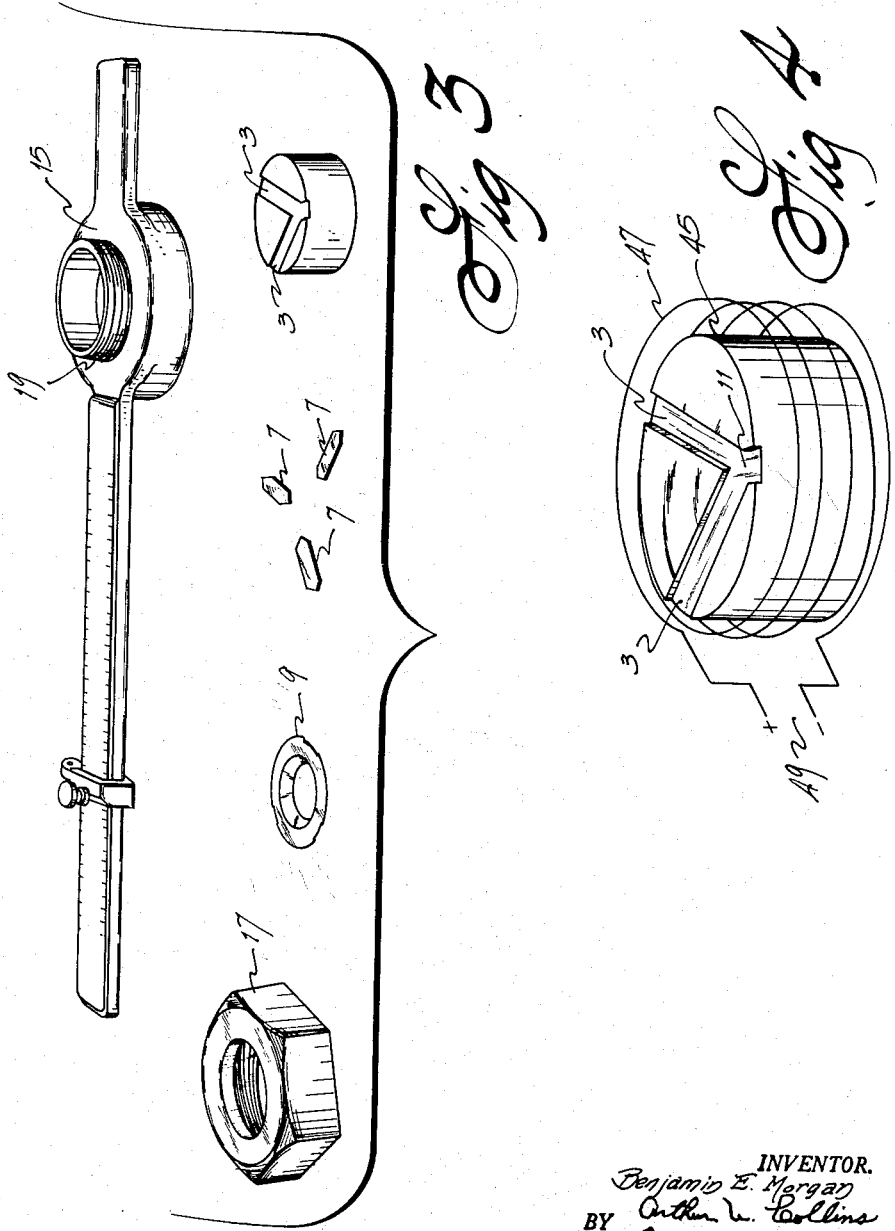
INVENTOR.
Benjamin E. Morgan
BY Arthur L. Collins
John P. Crean
Attorneys 3,113,449
FLAT SPECIMEN WEAR TESTER
Benjamin E. Morgan, 808 Monroe Ave., Ardsley, Pa.
Filed Feb. 27, 1961, Ser. No. 92,105
3 Claims. (Cl. 73—10)
(Granted under Title 35, U.S. Code (1952), sec. 266)

The invention described herein may be manufactured and used by or for the government of the United States of America for governmental purposes without the payment of any royalties therein or therefor.

This invention relates to an apparatus for determining the wearing qualities of metallic coatings and solid film lubricants.

The invention is for the purpose of the determination of the relative wearing or wear-resisting qualities of different metallic coatings or dry film lubricant when in frictional contact, to the end that they may subsequent to tests be listed or standardized relatively to their different standards of wearing or wear-resisting quality.

All such determinations are, by the use of the testing apparatus according to the invention, capable of being conveniently arrived at with reference to pre-determined known factors relative to the moving and contacting part or parts of such testing means as for example speed thereof; the load thereupon; the temperature thereof; the nature of the metallic coating or solid film lubricant used; the thickness of the coating or solid film lubricant; the area of contact between parts; the degree of fineness of the finished surfaces of the said contacting parts; and the duration of the tests.

Heretofore, it was the practice to use three contacting balls of suitable material, for example, steel, which were held in a fixed position relative to each other, and a fourth ball contacting with and centered by the set of three balls. The said fourth ball was pressed against the three balls with a preferably adjustable force and a rotating movement was set up between the set of three balls and the fourth ball. The contacting points of the three balls with the fourth ball were kept wetted by the lubricant to be tested by immersing the balls in a bath of the lubricant. However, when it became necessary to test dry film lubricants or metallic coatings, a problem arose in properly coating the balls so that an accurate result could be successfully performed and so that the relation between the wearing or wear-resisting qualities of different metallic coatings or dry films could be accurately ascertained.

According to the invention, use is made of three flat pieces which have been previously coated with a particular metallic coating or bonded film, which are held in a fixed position relative to each other. A ball makes a point contact with and is centered by the three flat specimens. The said ball is pressed against the three specimens with a preferably adjustable force, and a rotating movement is set up between the set of three flat specimens and the ball.

Therefore, it is an object of the invention to provide an apparatus of simple and rugged construction, in which the conditions of pressure and velocity can be readily adjusted and in which surfaces which are subjected to wearing during the test can be easily examined after such test and be renewed in an easy and inexpensive manner.

It is a further object of this invention to so modify the existing apparatus used for testing fluid lubricants whereby it is made adjustable to conveniently test solid film lubricants and metallic coatings by substituting for the three balls formerly used a set of three flat pieces.

Figure 2:
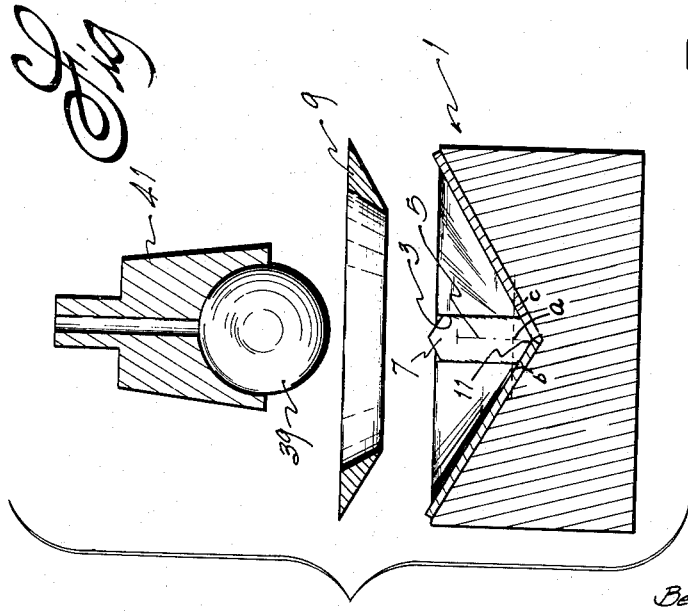

Other objects and many of the attendant advantages of this invention will be readily appreciated as the same becomes better understood by reference to the following detailed description which is considered in connection with the accompanying drawings wherein:

FIG. 1 shows a partial cross section in front elevation of the apparatus as modified;
FIG. 2 is a composite cross sectional view showing the modification in greater detail;
FIG. 3 is an exploded view showing the various component parts of the modification;
FIG. 4 is a plan view showing another embodiment of the invention.

In the illustrated embodiment of the invention, FIG. 1 shows a standard wear tester which has been modified by a cylindrically shaped adapter 1 which makes it possible to test coatings with three flat pieces 7 rather than three balls. Three grooves or slots 3 are formed in the top of the adapter and they extend longitudinally and inwardly toward the center 5 of the adapter. The slots 3 are placed equidistantly around the periphery of the adapter. Three flat pieces 7, being pointed out at their respective ends, are fitted into the grooves. The pointed tips have been previously plated or coated with the particular film to be tested. The three flat pieces 7 are arranged and pressed downwardly and inwardly by means of an annular member 9 having a conical lower surface, so that the pieces 7 are firmly pressed into the three slots 3 thereby making a point contact 11 (FIG. 2) with respect to each other and are held in a fixed position. The adapter 1 is placed on a table 13; a flange shaped member 15 bearing on the annular member 9 is pressed downwardly by means of a nut or the like 17 which screws onto threads 19 provided on the flange shaped member 15.

The table 13 rests on a base 21, ball bearings 23 being arranged between the table and the base so as to allow a rotational movement of the former in relation to the latter. An upwardly directed force may be applied to the base by hydraulic means 25.

The hydraulic means may consist of a counterweighted lever arm 27 which is supported on the fulcrum 29. Upon movement of the lever arm about the fulcrum, pressure is exerted through the step bearing 31 to the pressure pin 33. A second step bearing 35 is positioned inside of a rubber disc 37 and presses against the pin 33.

The pressure is transmitted to the adapter 1 and lifts it upwardly so that the three flat pieces 7 make contact with a ball 39 which is fixedly clamped in a split, fork-shaped holder 41, the prongs of which are pressed together by means of a bolt and nut (not shown). The holder 41 is connected to a shaft 43 supported in suitable bearings, which shaft can be rotated by means of a driving means, such as a driving pulley (not shown), which may be directly coupled to a motor or like means (not shown).

A test can be carried out with the apparatus as follows:
The ends of the three flat pieces 7 are coated with a test coating such as titanium previous to being placed into the slots or grooves 3 of the adapter 1. Since these pieces are coated at the pointed ends thereof, it is possible to use the same piece for two different tests. They are clamped into a fixed position by inserting ring 9 and pressing it down by the member 15 and the nut 17. A ball 39 is clamped into holder 41. Then the table 13 is raised by applying a force to the lever arm 27 so that the adapter 1 is raised whereby the ball 39 makes contact with the flat pieces at the three points, $a$, $b$, and $c$ shown in FIG. 2. Shaft 43 is put into rotation. The force and the number of rotations per time unit of shaft 43 are preferably adjustable. The moment of the forces transferred from ball 39 to the points $a$, $b$ and $c$ of the flat specimens through friction action can be measured by means of a spring balance or any other device of this kind (not shown). The magnitude of the said moment and any changes thereof during the test provide valuable indication of the extreme pressure qualities of the film under test.

After the testing apparatus has run a certain time period, the flat specimens 7 can be taken out and examined to investigate the scar or wear they have undergone. The area of the wear surfaces formed on the specimens under the extreme pressure condition provides a further measure for the wearing effect of the particular metallic coating under the circumstances chosen.

FIG. 4 indicates another embodiment of this invention wherein a heating coil 45 surrounds the outer periphery of the adapter 1. This heating coil connected to a suitable source of power 49 enables the test to be conducted at various environmental conditions, and is extremely helpful in determining the wearing resistance of dry film lubricants which must be tested at extremely high temperatures along with high pressures.

It will be obvious from the foregoing that the modification of the standard lubricant testing machine enables this machine to be used for the testing of dry film lubricants as well as the ordinary wet lubricants. With this particular modification, it is possible to easily change from a machine designed to test liquid lubricants to one designed to test dry film lubricants or metallic coatings. An advantage in use of the flat type specimen resides in their simple construction and in their ease of coating as compared with balls, which is of importance when it is desired to investigate the behavior of metal surfaces of a material other than generally used for balls of ball bearings.

Obviously many modifications and variations of the present invention are possible in the light of the above teachings. It is therefore to be understood that within the scope of the appended claims the invention may be practiced otherwise than as specifically described.

What is claimed is:
1. Apparatus for testing dry film lubricants comprising three flat specimens having their ends pointed and coated with said dry film lubricant; a cylindrically shaped adapter having three grooves spaced equidistantly around the periphery thereof and extending inwardly toward the center of the adapter; means for clamping the three specimens into the grooves; a ball adapted to contact the ends of said flat specimens; and means for rotating said ball.

2. An apparatus according to claim 1 including a heating coil which surrounds the adapter; a power source connected to the heating coil for controlling the temperature at which the test is conducted.

3. Apparatus for testing lubricants comprising flat members, a ball adapted to contact said flat members; a holder for said ball; a rotatable shaft connected to said holder, the combination therewith of the improvement for enabling the said apparatus to test dry film lubricants, said improvement including a cylindrically shaped member having three grooves extending longitudinally and inwardly toward the center thereof and spaced equidistantly around the periphery thereof, said grooves being adapted to receive the flat members; a ring-shaped body for clamping said flat members in fixed position toward the center of the cylindrically shaped members and against each other whereby the ball as it is being rotated by the said shaft will be caused to make a point contact with each of the flat specimens.

References Cited in the file of this patent
UNITED STATES PATENTS

| | | |
|---|---|---|
| 1,990,771 | Boden | Feb. 12, 1935 |
| 2,005,521 | Harrington | June 18, 1935 |
| 2,019,948 | Boerlage | Nov. 5, 1935 |
| 2,108,948 | Smith | Feb. 22, 1938 |